P. W. SWERN.
APPARATUS FOR MOVING WHEELED VEHICLES.
APPLICATION FILED DEC. 30, 1915.
1,363,442.
Patented Dec. 28, 1920.
7 SHEETS—SHEET 1.
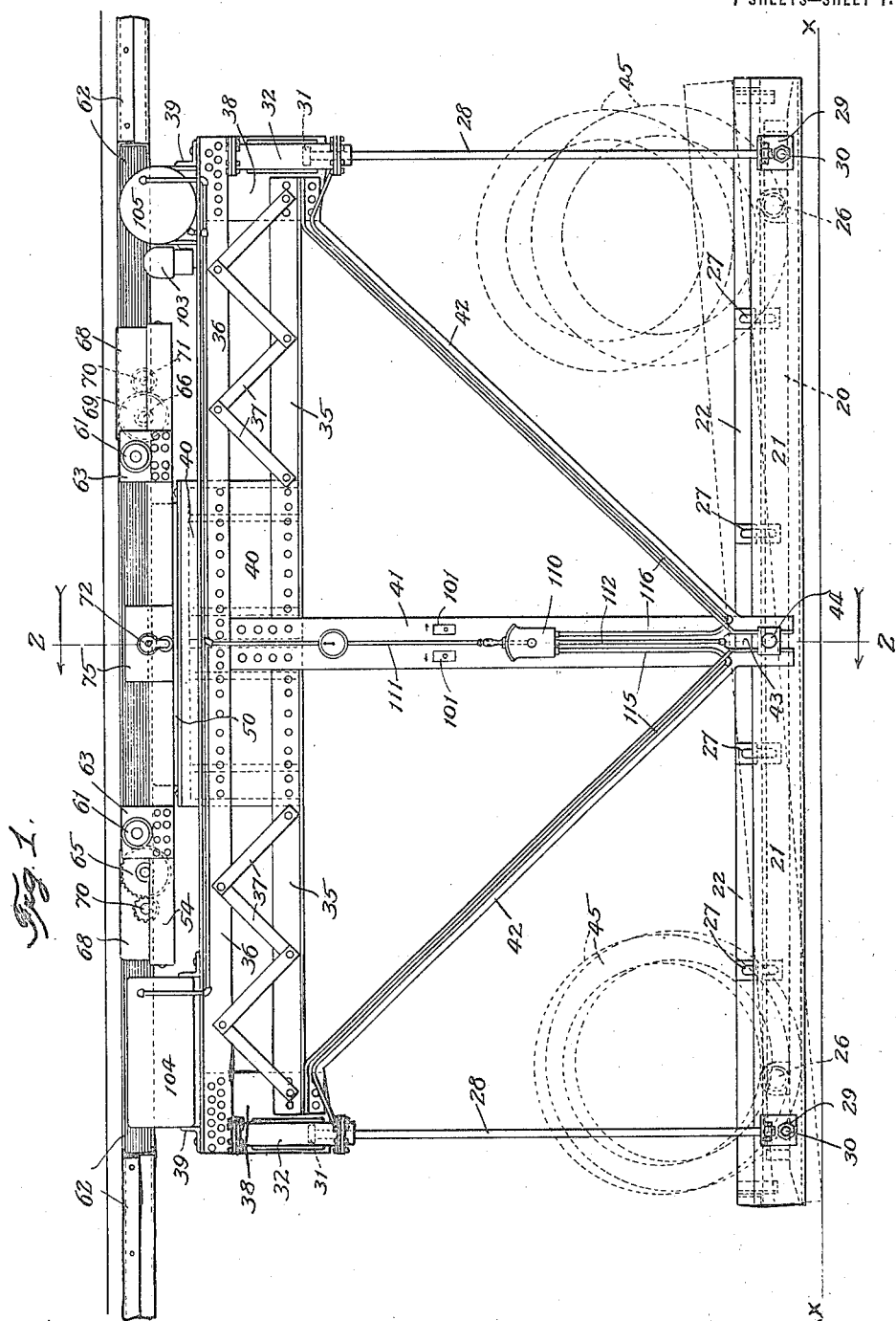

P. W. SWERN.
APPARATUS FOR MOVING WHEELED VEHICLES.
APPLICATION FILED DEC. 30, 1915.
1,363,442.
Patented Dec. 28, 1920.
7 SHEETS—SHEET 2.
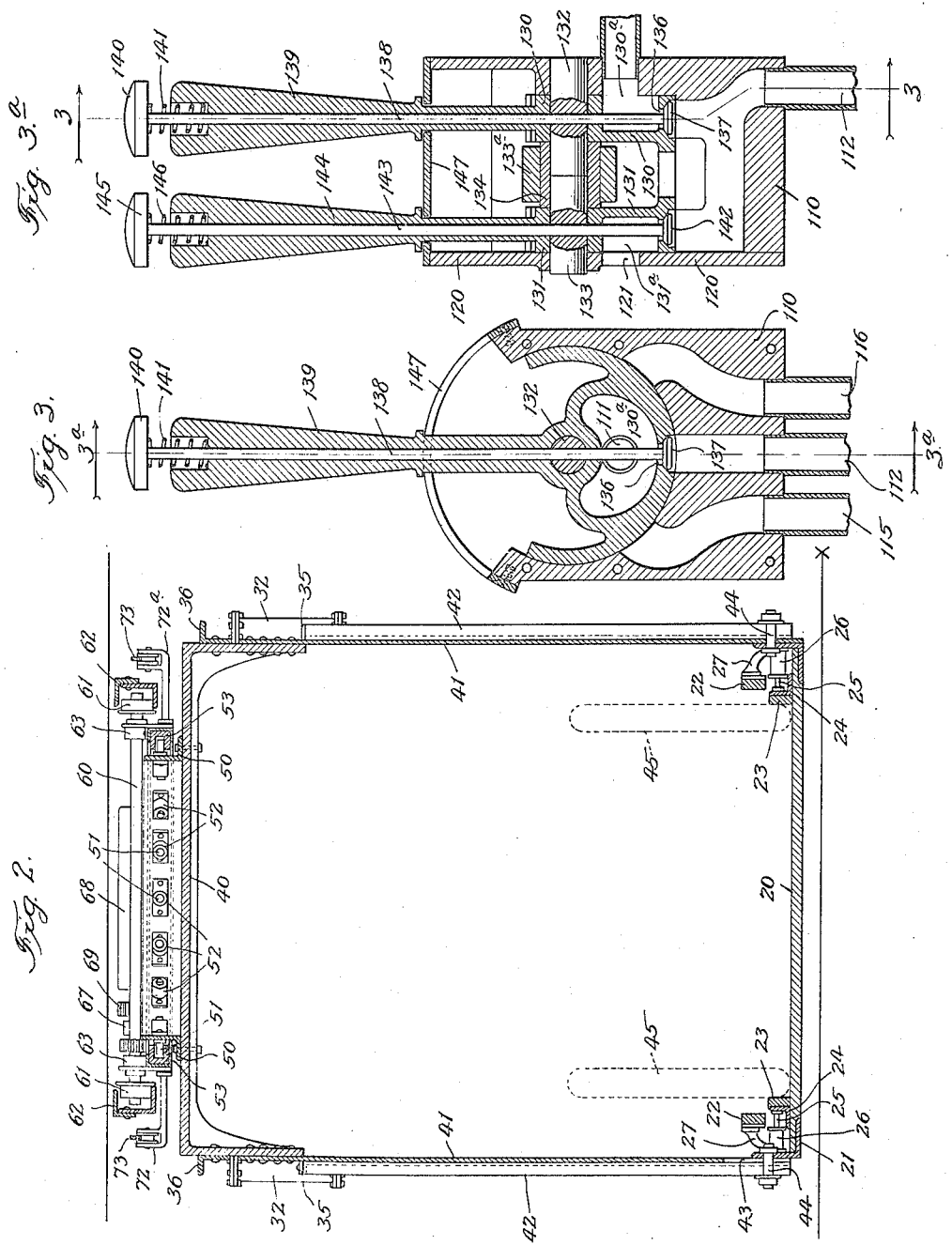

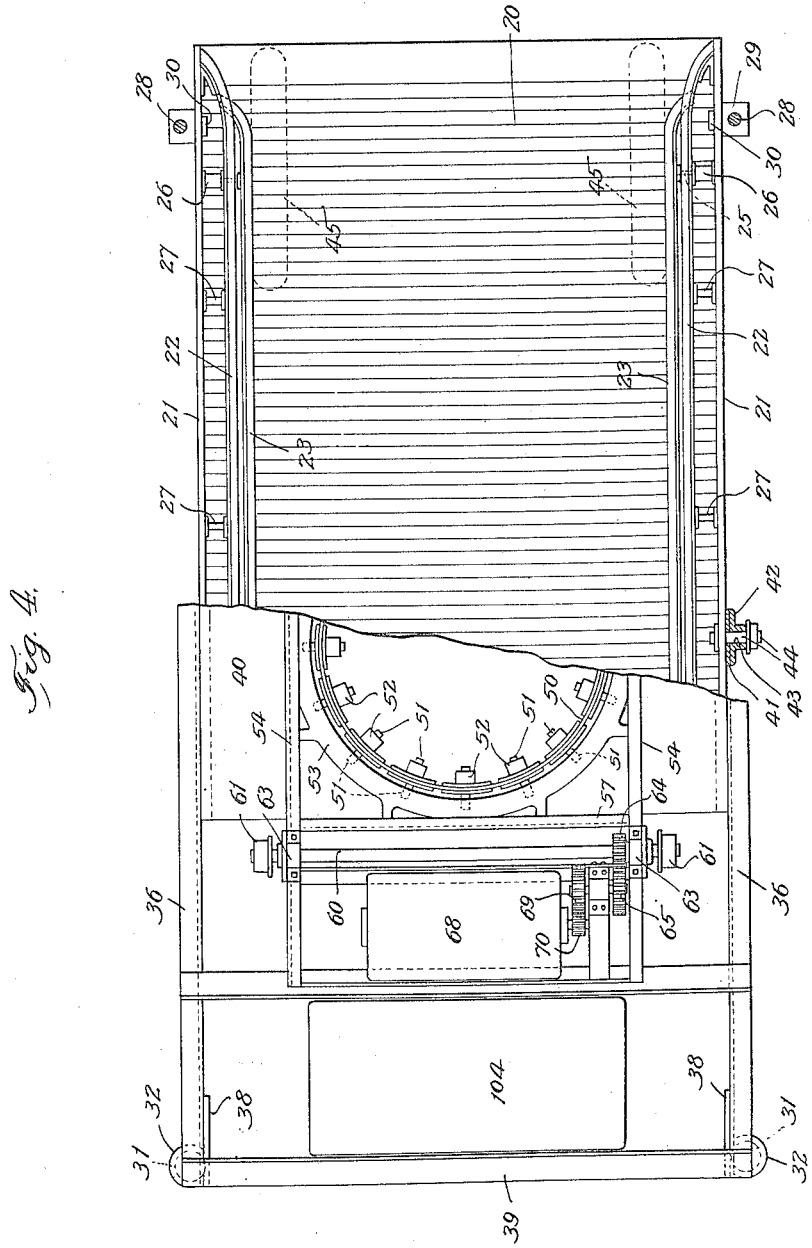

P. W. SWERN.
APPARATUS FOR MOVING WHEELED VEHICLES.
APPLICATION FILED DEC. 30, 1915.
1,363,442.
Patented Dec. 28, 1920.
7 SHEETS—SHEET 4.
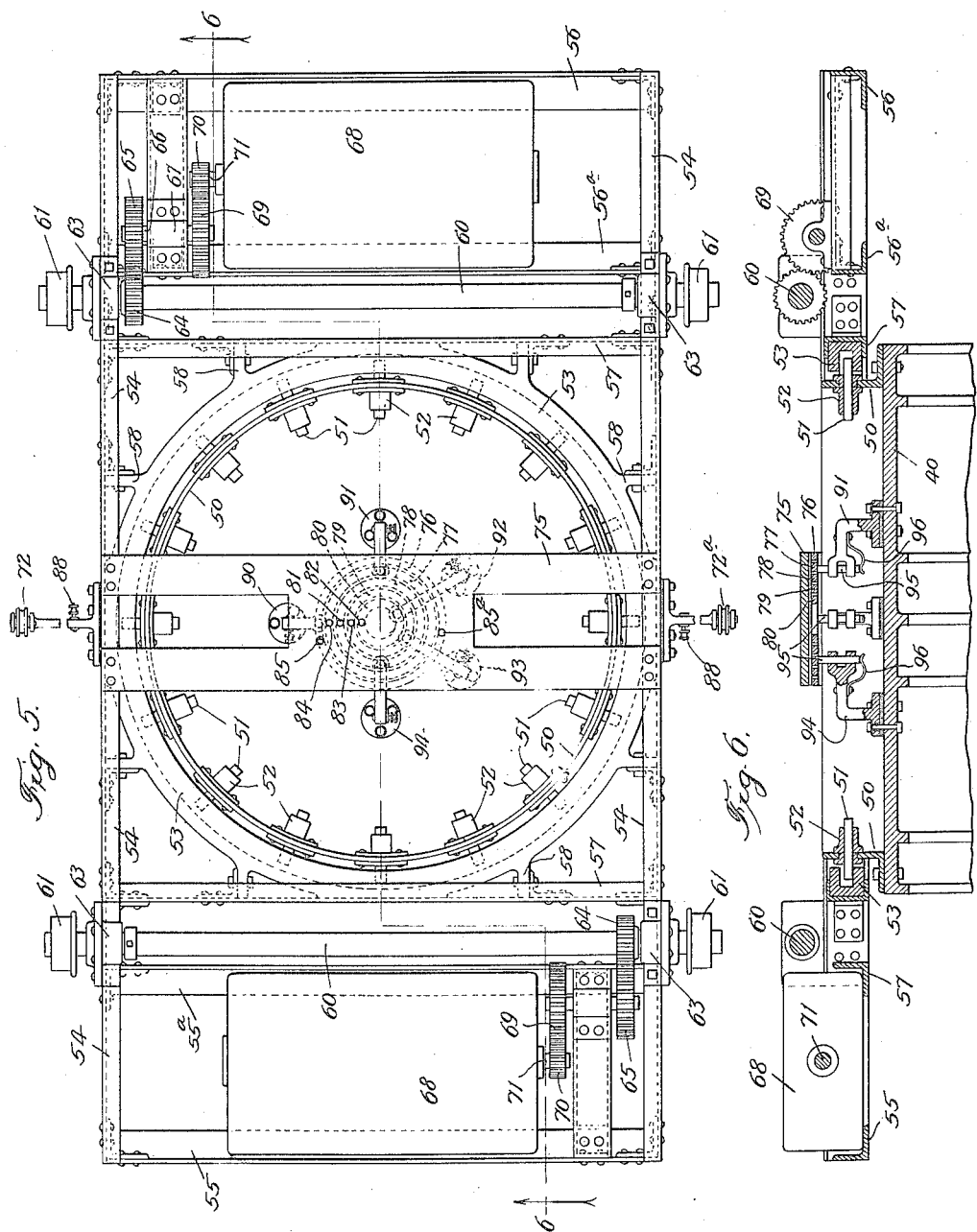

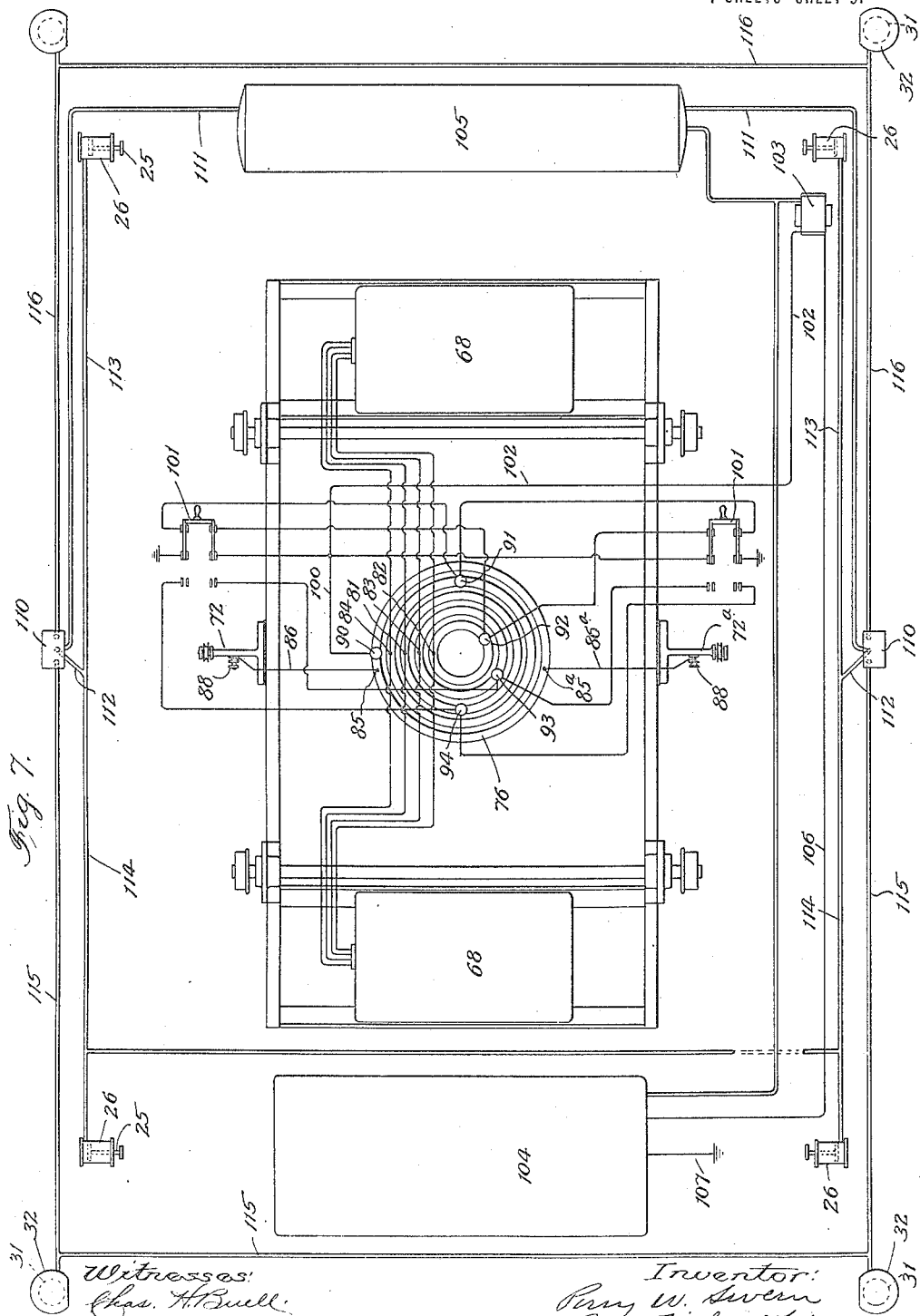

P. W. SWERN.
APPARATUS FOR MOVING WHEELED VEHICLES.
APPLICATION FILED DEC. 30, 1915.

1,363,442.

Patented Dec. 28, 1920.
7 SHEETS—SHEET 6.

WITNESSES
J. G. Anderson
M. M. Hassnow

INVENTOR
PERRY W SWERN

P. W. SWERN.
APPARATUS FOR MOVING WHEELED VEHICLES.
APPLICATION FILED DEC. 30, 1915.
1,363,442.
Patented Dec. 28, 1920.
7 SHEETS—SHEET 7.
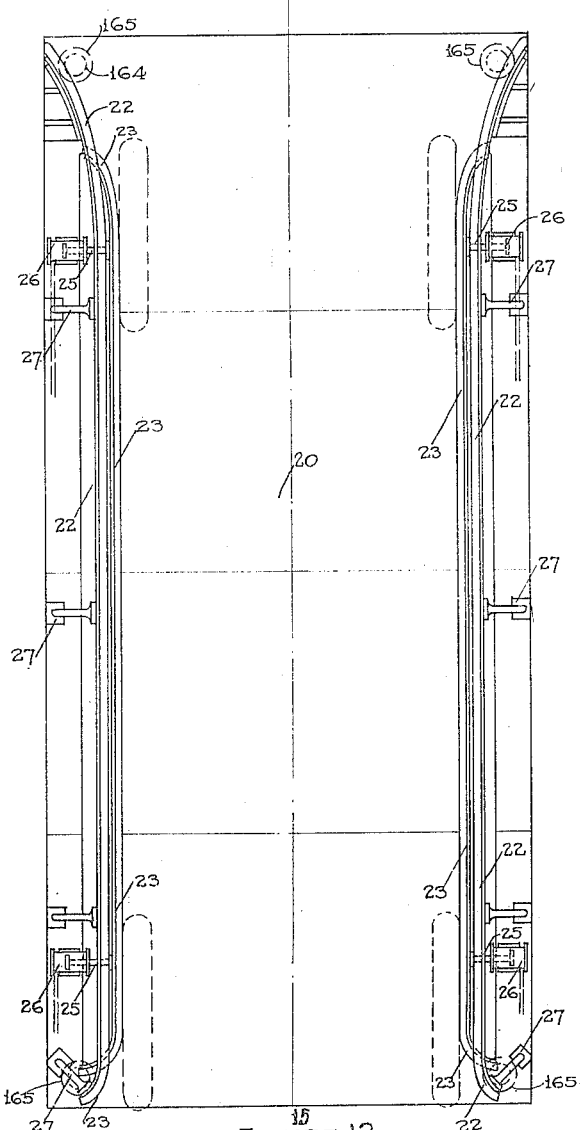
INVENTOR • PERRY W SWERN •

UNITED STATES PATENT OFFICE.

PERRY W. SWERN, OF OAK PARK, ILLINOIS.

APPARATUS FOR MOVING WHEELED VEHICLES.

1,363,442.  Specification of Letters Patent.  Patented Dec. 28, 1920.

Application filed December 30, 1915. Serial No. 69,347.

*To all whom it may concern:*

Be it known that I, PERRY W. SWERN, a citizen of the United States, residing in Oak Park, in the county of Cook and State of Illinois, have invented certain new and useful Improvements in Apparatus for Moving Wheeled Vehicles, of which I do declare the following to be a full, clear, and exact description, reference being had to the accompanying drawings, forming part of this specification.

The present invention has for its object to provide an improved apparatus whereby automobiles or like vehicles may be readily removed from one location to another within a building or like situation, and the invention consists in the features of novelty hereinafter described, illustrated in the accompanying drawings and particularly pointed out in the claims at the end of this specification.

Figure 11:
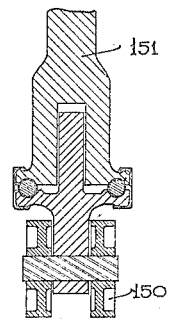
Figure 9:
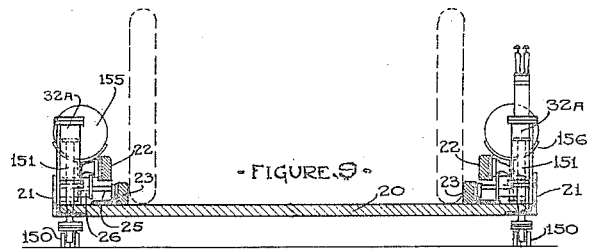
Figure 8:
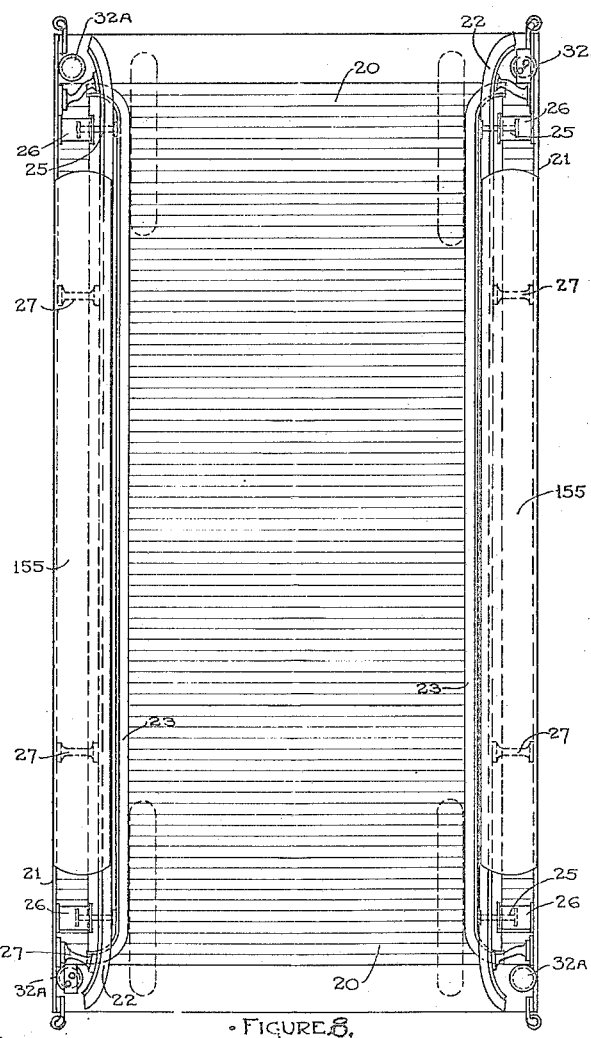
Figure 10:
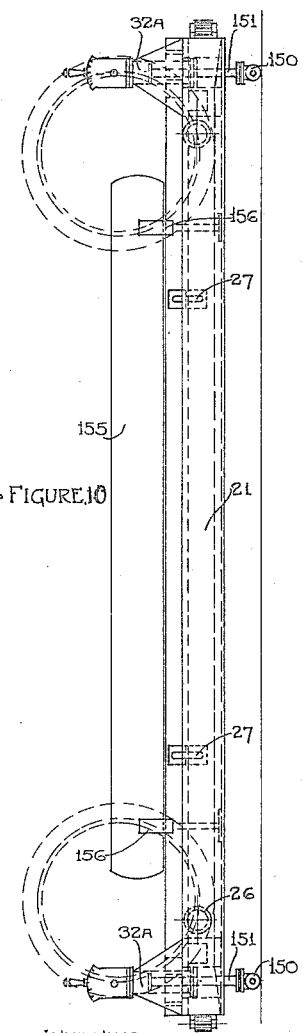

Figure 1 is a view in side elevation of an apparatus embodying my invention. Fig. 2 is a view in central vertical cross section. Fig. 3 is a detail view upon an enlarged scale of a multi-way valve mechanism for controlling the flow of fluid to the operating cylinders, this view being taken on line 3—3 of Fig. 3ª. Fig. 3ª is a view of the multi-way valve mechanism on line 3ª—3ª of Fig. 3. Fig. 4 is a plan view, portions being broken away for better illustration. Fig. 5 is a plan view upon an enlarged scale of the overhead platform carrying the turntable track and motors. Fig. 6 is a view in longitudinal section on line 6—6 of Fig. 5. Fig. 7 is a plan view with parts omitted and showing diagrammatically the piping and electric circuits. Fig. 8 is a view of a modified form of a transfer platform embodying certain features of my invention. Fig. 9 is a view in cross section centrally through the platform but showing the storage tanks and certain other parts in elevation. Fig. 10 is a view in side elevation of the platform shown in Fig. 8. Fig. 11 is an enlarged detail view in vertical section through one of the caster wheels supporting the platform shown in Fig. 8, this view showing the connection of the caster wheels to the lower end of the piston rod. Fig. 12 is a plan view of a permanently located platform embodying certain features of my invention. Fig. 13 is a view in cross section on line 15—15 of Fig. 12. Fig. 14 is a view in longitudinal section on line 16—16 of Figs. 12 and 13.

My invention is more particularly adapted for use in garages, storage spaces or manufacturing plants where it is desirable to carry or move from one location to another a rolling vehicle in relatively short length of time. In its most extended embodiment, my invention is designed to provide a movable platform supported by a turntable suspended from an overhead track so that when an automobile or like vehicle has been placed upon the platform, it may be transferred from one location to another, as for example, along a passageway or corridor to a point opposite any one of several stalls, and the platform may then be given a partial turn so that the vehicle may be delivered into its appropriate stall or at the desired point.

While I set forth in the following description the most extended embodiment of my invention, I wish it distinctly understood that the details of construction may be extensively modified without departing from the spirit of the invention and that features of the invention may be employed without its adoption as an entirety.

The platform 20 is shown as consisting of flooring boards that are supported on opposite sides by angle bars 21 that extend from end to end of the platform. Above the platform 20 at each side thereof are mounted guide bars 22, the ends of which are preferably curved as shown at the right hand portion of Fig. 4 of the drawings, so as to insure the proper delivery of the automobile onto the platform. These guide bars 22 may be metal strips preferably faced with wood, the metal strips being supported by brackets or brace bars 27 that are bolted to the upstanding members of the angle bars 21, as shown in Figs. 2 and 4.

Below the guide bars 22 and preferably in close proximity to the surface of the platform 20 are mounted the clamp bars 23 that are adapted to move into engagement with the wheels of the automobile, or like vehicle, and securely hold it upon the platform against danger of accidental movement and until the platform has been tilted (in a manner to be hereinafter described) to give the vehicle sufficient momentum for delivering it into the desired stall. As shown, each of the clamp bars 23 is mounted upon an angle bar 24 which may rest upon the upper surface of the platform 20 adjacent its side. The ends of the clamp bars 23 and of the angle bars 24 are curved, as shown in Fig. 4, and adjacent their ends the angle bars 24 have connected thereto the ends of the piston rods 25 of the compressed air (or other fluid) cylinders 26, these cylinders having their outer ends secured to the upstanding members of the angle bars 21. To the cylinders 26 are connected air delivery and discharge pipes hereinafter more fully described, and by means of the cylinders and their pistons, the clamp bars 23 can readily be moved into position to engage the wheels of an automobile after the latter has been rolled onto the platform 20 and will securely hold the wheels against rotation until the platform has been tilted the required distance for discharging the automobile therefrom.

The platform 20 is suspended at its four corners by means of the vertical rods 28, the lower ends of these suspension rods being conveniently attached to the platform by angle irons 29 that may be connected to the angle bars 21 by bolts 30 (see Figs. 1 and 4). The upper ends of the suspension rods 28 are connected to pistons 31 within cylinders 32 for compressed air or other fluid. These cylinders 32 are mounted at the corners of the overhead frame and to these cylinders lead air supply pipes, to be hereinafter more fully described, so that when compressed air or other fluid under pressure is admitted to the lower ends of the cylinders, the pistons 31 can be raised to lift the ends of the platform 20 to the desired extent.

The overhead platform is preferably formed of the lower and upper side members 35 and 36 that may be angle bars connected by struts or braces 37. At the ends, the angle bars 35 and 36 have riveted thereto the vertically disposed corner plates 38 to which the cylinders 32 are secured, and the angle bars 36 at the opposite sides of the frame are connected together at their ends by angle bars 39, as clearly shown in Figs. 1 and 4.

Between the side members of the overhead frame extends a cross frame 40, preferably of cast steel, the downwardly extending end portions of which are riveted, as shown, to the angle bars 35 and 36. Upright plates or members 41, having their upper ends riveted to the ends of the cross frame 40, extend downwardly from the center of each side of the overhead frame and to the lower end of each of these upright plates or members 41 is connected a diagonally disposed brace bar 42, the upper ends of these brace bars 42 being riveted, as shown in Fig. 1, to the corner plates 38 of the overhead frame. The lower end of each of the upright plates or members 41 is formed with a slot 43 to receive a trunnion pin or bolt 44 that projects from the angle bar 21 at each side of the platform 20.

From the description of parts as thus far defined, the operation will be seen to be as follows: When a car or vehicle is to be delivered onto the platform 20, compressed air will be allowed to escape from the lower portion of the cylinders 32, thereby permitting the platform to descend until it rests upon the floor X. The car will then be pushed, or driven by its own power, onto the platform, after which compressed air will be admitted to the outer ends of the cylinders 26 so as to cause the clamp bars 23 to engage the wheels of the automobile in order to securely hold it in position upon the platform. Compressed air will then be admitted to the lower ends of the cylinders 32, thereby causing the platform to be raised slightly above the floor X so that the platform, as will hereinafter more fully appear, can be transferred from one location to another. When the platform has been brought opposite the location at which the automobile is to be discharged, a partial revolution will be imparted to the platform to bring the platform opposite and parallel to this desired location. The mechanism which so supports the platform as to permit it to be transferred from point to point and to be revolved, will hereafter more fully appear. When a partial revolution has thus been imparted to the platform, the compressed air will be allowed to escape from the lower ends of the cylinders 32 at one end (for example, the left hand end) of the overhead frame so as to tilt the platform from the position shown by full lines in Fig. 1 to the position shown by dotted lines in such figure. If now the compressed air in the outer ends of the cylinders 26 that control the clamp bars 23 is released, these clamp bars will cease to exert pressure against the wheels of the automobile (indicated by the dotted circles 45 in Figs. 1 and 2) and the automobile can then roll from the platform into the desired location. It is obvious that the exact extent of movement necessary to land the automobile at the point desired can be accurately given by varying the height to which the end of the platform 20 is raised and by thus tilting the platform, the discharge of the automobile can be easily and accurately effected without the necessity of starting its own power.

Upon the top of the cast metal frame 40 is mounted a circular angle bar 50 from which project outwardly and radially axles 51 mounted in bearings 52 that are bolted to the angle bar 50. This construction is most clearly indicated in Figs. 5 and 6. These axles 51 rest upon a ring-shaped cast steel track or turntable 53, the annular bearing portion of which is preferably of channel form. The track or turntable 53 is shown as supported by a frame that consists of the longitudinal side channel bars 54 and end members 55 and 56 of angle form and the cross channel bars 57, these several cross bars being connected to the longitudinal channel bars 54 by suitable clip angles, as shown more particularly in Fig. 5 of the drawing. The track 53 is shown as provided with arms 58 projecting therefrom, and by means of these arms and suitable clip angles, the angular track is securely held in position upon the frame.

In order to propel the platform forward and backward from one location to another, I prefer to employ electric motors. Preferably, the turntable supporting frame of my apparatus will be provided with a motor and driving gear at each end and I have shown this arrangement in the accompanying drawings, although the specific driving mechanism is not essential to carrying out the broad features of my invention. Across the side channel bars 54 extend the axles 60 upon the outer ends of which are mounted the carrying wheels 61 adapted to travel on the overhead tracks 62 that are suitably suspended from an overhead support. These tracks 62 are shown as formed of angle bars united together to form a channel-shaped track, although obviously any other suitable form of track may be employed. The axles 60 of the carrying wheels 61 are mounted in suitable bearings 63, as shown. These bearings have formed integral therewith suitable plates or flanges whereby the bearings are securely fastened, as by rivets, to the side bars 54 (see Figs. 5 and 6). Each of the axles 60 is shown as having fixed thereon a gear wheel 64 that meshes with a gear wheel 65 on the short shaft 66 that is mounted in suitable bearings 67 near one end of the electric motor 68. The shaft 66 has fixed to its inner end a gear wheel 69 that meshes with a pinion 70 on the end of the motor shaft 71. Power is supplied to the motors 68 at the opposite ends of the turntable by suitable trolley arms 72 and 72^A at opposite sides of the turntable. I have shown two trolley arms in the accompanying drawings, as I regard this preferable, although obviously a single trolley arm might be used. The trolley arms, which are bolted, as shown in Figs. 5 and 6, to the sides of the channel bars 54, have their outer ends provided with the usual trolley wheels adapted to receive current from an overhead conductor 73 (see Fig. 2). The electric motors 68, shown as mounted upon the angle bars 55 and 55^A and 56 and 56^A, may be of any suitable construction, such, for example, as are ordinarily used in electric railway cars or vehicles, and the current may be delivered to the motors in any convenient manner. In Figs. 5, 6 and 7 of the drawings, I have indicated one way in which electric current may be delivered to effect the operation of the motors, but obviously a skilled electrician could readily devise other means for accomplishing this purpose.

Between the side channel bars 54 extends a supporting plate 75 upon the under side of which at its center and suitably insulated therefrom, is mounted a series of concentric contact rings 76, 77, 78, 79 and 80. To these concentric contact rings connect the plugs 81, 82, 83, 84, 85 and 85^A that pass through insulating sleeves in the transverse plate 75. The plugs 85 and 85^A are connected by suitable wires 86 and 86^A (see Fig. 7) to binding posts 88 and 88^A upon the trolley arms 72 and 72^A, and current is thus delivered from either of the trolleys to the outermost ring 76 of the series. From the ring 76 current will pass into a brush 90 that is mounted upon the top of the cast steel cross frame 40, being suitably insulated therefrom. There are a series of brushes 90, 91, 92, 93 and 94 of like construction and similarly mounted upon the top of the cross frame 40 and the description of any one of these brushes will answer for all. As shown, each of the brushes comprises an angular arm in the free end of which is mounted an adjustable contact member 95 (see Fig. 6) that is forced normally upward by a spring 96 that is fastened to the under side of the corresponding brush arm. Each brush arm is provided with a binding post by means of which current is led therefrom to the appropriate circuits. As current is received from the outermost contact ring 76 by the brush 90, it will pass through the binding post of the contact arm of such brush to a wire 100 (see diagram Fig. 7) that leads to a suitable controlling switch 101 conveniently mounted on the vertical members 41 at both sides of the apparatus (see Figs. 1 and 7). This switch 101 may be of any suitable construction for controlling motors adapted to operate in either direction. From the switch 101 current may pass through the four wire system leading from the switch to the brushes 91, 92, 93 and 94 and to the rings 77, 78, 79 and 80, and thence by plugs 81, 82, 83 and 84 to suitable wires leading to the motors 68. I have shown the wiring for controlling the passage of current to and from the motors in more or less diagrammatic manner, as this may be widely varied without affecting the invention. It will be understood that by the operation of the switch 101 the motors can be caused to drive the carrier in either direction.

In Fig. 7 I have indicated diagrammatically a circuit 102 by which current will be delivered to an automatic air motor controller 103 whereby the operation of the air compressor 104 is controlled, this air compressor serving to pump air into the compressed air tank 105, from which service pipes lead to the various air cylinders hereinbefore described. As shown in Fig. 7, the wire 102 connects the air motor controller 103 with the power wire 100 and a wire 106 leads from the air motor controller 103 to the air compressor 104 that is suitably grounded as at 107. As the specific construction of the air motor controller and the means whereby its automatic operation is effected, form no part of the present invention, I do not deem it necessary to describe the same in detail.

In Fig. 7 is illustrated diagrammatically the arrangement of the pipes whereby compressed air is delivered to the compressed air cylinders and to the multiway control valve 110. I have shown the piping as controlled by two valves 110 (see Fig. 7) mounted upon the uprights 41 at each side of the apparatus.

From the compressed air tank 105 main pipes 111 lead to the casing of the valves 110 and from the casing of the valves 110 air pipes 112 branched at their lower ends 113 and 114, lead to the outer ends of the compressed air cylinders 26 whereby the brake bars 23 are operated. From the valves 110 air pipes 115 and 116 lead to the lower ends of the compressed air cylinders 32, the piston rods 31 of which serve to support the platform 20. The valve within the casing 110 may be any suitable type of multiway valve adapted to properly control the flow and exhaust of air through the several air pipes. In Figs. 3 and 3ª of the drawings, I have shown one form of multiway valve for this purpose. The casing of this multiway valve is shown as provided at its back with a port to receive one end of the compressed air supply pipe 111 and in the front cover plate 120 is formed an escape port 121. In the lower part of the valve casing 110 are formed a series of ports adapted to receive the ends of the air pipes 112, 115 and 116 which connect with the compressed air cylinders. The interior of the casing 110 is formed with a circular valve seat to receive the segmental valves 130 and 131 that are revolubly sustained by the trunnion pins 132 and 133. One of these trunnion pins 132 is journaled in the back of the valve casing 110 and in the transverse bar 133 that extends from side to side of the casing and that is formed integral with the side walls thereof. As shown, a bearing sleeve 134 receives the ends of the trunnion pins 132 and 133. The trunnion pin 133 is journaled in the sleeve 134 and in the front cover plate 120 of the valve casing. The segmental valve 130 is formed with a chamber 130ᴬ that communicates with the compressed air supply pipe 111, and in the lower portion of the chamber is formed a port 136 adapted to be closed by a supplemental valve 137 on the end of the valve stem 138. This valve stem 138 passes through the trunnion rod 132, through the hub of the valve 130 and through the handle 139 of the valve 130 to a slight distance above the upper end of the valve handle, where the stem is provided with a thumb piece 140. Between the thumb piece 140 and the bottom of a seat formed in the upper end of the valve handle 139 is placed a coil spring 141 that serves to hold the valve 137 in normally closed position. The valve 131 is similar in shape to the valve 130 and is provided with a chamber 131ᴬ that communicates with the exhaust port 121 in the cover plate 120 of the valve casing. In the lower part of the chamber 131ᴬ of this valve 131 is formed a port that is normally closed by a supplemental valve 142 at the lower end of the valve stem 143 that passes upwardly through the handle 144 of the valve 131. This valve stem 143 is provided at its upper end with a thumb piece 145 that bears upon the upper end of a coil spring 146 sitting within a seat at the top of the handle 144 of the valve 131. The handles 138 and 144 of the valves 130 and 131 pass through slots in a curved cover plate 147 that is fastened to the top of the valve casing 110.

From the foregoing description it will be seen that when compressed air is to be admitted to the delivery pipe 112, and from this pipe by the branch pipes 113 and 114 to the brake controlling cylinders 26 at the sides of the platform, the operator will depress the thumb piece 140 at the upper end of the handle 139 of the valve 130, thereby unseating the supplemental valve 137 at the lower end of the valve stem 138, the valve 130 being seen at such time to be in the position shown in Figs. 3 and 3ª of the drawings. When the compressed air is to be allowed to escape from the cylinders 26 at the sides of the platform 20, the operator will depress the thumb piece 145 at the top of the handle 144 of the valve 131, thereby permitting air to escape through the chamber 131ᴬ of the valve 131 and through the escape port 121. By this means, the brake bars 23 may be applied to and released from the wheels of a vehicle on the platform.

When it is desired to tip the platform from the position shown by full lines in Fig. 1 to the position shown by dotted lines in Fig. 1, the valve 130 will be turned by means of its handle 139 until the valve port 136 in the bottom of its chamber and the supplemental valve 137 are opposite the port or channel that communicates with the air pipe 115. The operator will then depress the thumb piece 140 at the top of the handle of the valve 130 so as to open the supplemental valve 137 and permit air to pass from the delivery pipe 111 through the chamber 130ᴬ of the valve 130 into the channel that leads to the air pipe 116, whence it will pass to the lower sides of the pistons of the cylinders 32 and will raise the right-hand end of the platform, as shown in Fig. 1. When the platform is raised to the desired extent and the vehicle has been discharged therefrom, the operator will turn the valve 131 to bring the port in its lower portion and its supplemental valve 142 opposite the passageway that leads to pipe 116, and the operator will then depress the thumb piece 145 at the top of the handle 146 of the valve 131 so as to open the supplemental valve 142 and allow air to escape from the cylinder 32 through the pipe 116 and through the chamber 131ᴬ of the valve 131 and through the escape port 121.

When the platform is to be tipped in a direction opposite that last described, the multiway valves will be correspondingly operated, but as this operation is obvious, it need not be particularly described.

While I have set forth in the foregoing description what I regard as the most extended embodiment of my invention, it will be understood that extensive modifications thereof may be made and that features of the invention may be employed without its adoption as an entirety. Thus, for example, in Figs. 8 to 11 of the drawings, I have shown how features of my invention may be employed in connection with a rolling truck adapted to carry the automobile or like vehicle from point to point and to discharge the same by tipping the platform of the truck endwise. In this form of the invention, the platform 20 consists of a suitable floor the edges of which are shown as supported by angle bars 21 longitudinally at each side of the truck. At each end of the platform and beneath the same are arranged the caster wheels 150 connected to the lower ends of piston rods 151 that pass upward through the platform and into cylinders 32ᴬ for compressed air or other fluid under pressure. By admitting compressed air behind the pistons within the cylinders 32ᴬ at either end of the platform, such end of the platform can be raised to any desired height necessary to discharge the vehicle from the platform.

Extending from end to end of the platform are guard rails 22 similar to the guard rails hereinbefore described and similarly supported by brackets 27ᴬ that are secured to the angle bars 21 at the sides of the platform. Beneath these guard rails are located the clamp bars 23, the construction and mode of operation of which are similar to the construction and mode of operation of the clamp bars hereinbefore described. These clamp bars rest normally upon the upper surface of the platform adjacent its sides and to these clamp bars are connected piston rods 25 that extend into the cylinders 26 for compressed air or other fluid under pressure. It will be understood, of course, that when compressed air is admitted behind the pistons of the cylinders 26, the clamp bars will be forced toward the center of the platform so as to securely engage the wheels of the vehicle upon the platform and prevent its accidental discharge therefrom.

In Figs. 8 to 11 of the drawings, I have shown the platform as provided with storage tanks 155 at each side thereof for compressed air, these storage tanks being suitably mounted upon brackets 156 that are secured to and extend upwardly from the platform.

Suitable multiway valves like those shown in Figs. 3 and 3ᵃ will be provided for controlling the admission and escape of compressed air to and from the lifting cylinders 32ᴬ and the cylinders 26 that control the operation of the clamp bars 23, and this multiway valve will be connected by suitable piping with the compressed air tank and with the cylinders.

Suitable piping will lead from the compressed air tanks 155 to the multiway valves and from these valves to the individual cylinders, but I have not deemed it necessary to illustrate this piping in the accompanying drawings, as it obviously will be similar to that hereinbefore described.

From the foregoing description it will be seen that when a vehicle has been loaded onto the platform, it can be moved to any desired point, and then, if necessary, the platform can be turned so as to bring the vehicle exactly in front of the position at which it is to be discharged, such, for example, as the stall of a garage, a show window or like situation, and the operator can then, by admitting compressed air to the lifting cylinders at one or the other end of the platform, tip the platform to the extent necessary for discharging the vehicle therefrom, and by releasing the clamp bars, can permit the vehicle to roll from the platform to the desired position.

In Figs. 12 to 14 of the drawings, I have shown how features of my invention may be applied to a platform arranged permanently at a desired point of a building, such for example, as in front of an elevator onto which automobiles or like vehicles may be loaded for transportation to other floors of the building. In this form of the invention, the platform 20 is shown as arranged within a pit or recess in the floor of the building, the platform being normally approximately level with the surface of the flooring. In Figs. 12 to 14, the platform has its side and end walls formed of channel bars 160 and 161 suitably united together and braced by means of transverse I-beams 162 and longitudinal angle bars 163. As shown, guard bars 22, curved at their ends, extend from end to end of the platform and are connected thereto by brackets 27 that are bolted to the edges of the platform. Beneath the guard bars and extending lengthwise of the platform are the clamp bars 23 which are similar in construction to the clamp bars hereinbefore described, and these clamp bars are connected to the ends of the piston rods 25 that enter the compressed air cylinders 26. By means of these compressed air cylinders, the clamp bars may be operated in the same manner as the clamp bars hereinbefore described.

The platform is supported by the piston rods 164 of four cylinders 165 for compressed air or fluid under pressure, two of these cylinders being shown as mounted beneath each end of the platform. These cylinders 165 may be held in position by brackets 166 that are secured to I-beams of the flooring, these I-beams being shown as embedded in the concrete of which the flooring is formed. The admission and escape of compressed air to and from the lifting cylinders 165 and to and from the cylinders 26 that operate the clamp bars 23 will be controlled by means of a suitable multiway valve mechanism (see Figs. 8 and 9), to which pipes will lead from the cylinders and which valve mechanism will be connected with a suitable compressed air system.

From the foregoing description it will be seen that when the automobile or like vehicle has been placed upon the platform, as shown in Fig. 12 of the drawings, and it is desired to move such vehicle from the platform, as for example onto the platform of an elevator, the operator will admit compressed air to the cylinders 165 at one end of the platform, causing such platform to be lifted to the desired height, after which he will release the compressed air from the clamp bar operating cylinders 26 so as to permit the vehicle to roll from the platform onto the elevator.

Having thus described my invention, what I desire to secure by Letters Patent is—

1. In transfer mechanism for wheeled vehicles, the combination of a vehicle supporting platform open at its ends to receive a vehicle, and means for bodily raising and lowering the platform and for tilting the same in opposite directions to discharge the vehicle from one end or the other of said platform, said means comprising a series of fluid pressure cylinders and pistons located beneath and connected to the opposite ends of said platform, and valve mechanism for controlling the flow of fluid to and from said cylinders.

2. In transfer mechanism for wheeled vehicles, the combination of a platform adapted to receive a vehicle, clamping devices arranged on said platform adjacent the upper surface thereof and adapted to engage the portion of the vehicle wheels adjacent the platform, means for tilting said platform endwise and means for shifting said clamping devices to engage and release the vehicle wheels.

3. In transfer mechanism for wheeled vehicles, the combination of a platform adapted to receive a vehicle, guides for the vehicle wheels arranged adjacent the surface of said platform, and clamping devices for engaging the wheels of said vehicle located below said guides and adapted to engage the vehicle wheels at points adjacent said platform.

4. In transfer mechanism for wheeled vehicles, the combination of a platform having guiding and clamping bars at its side edges both arranged to coöperate with the lower portion of the vehicle wheels, mechanism for operating said clamping bars to engage and release the vehicle wheels, and means for tilting the platform endwise to discharge the vehicle therefrom.

5. In transfer mechanism for wheeled vehicles, the combination of a platform adapted to receive a vehicle wheel and having longitudinally extending guiding and clamping parts at its opposite side edges arranged to coöperate with the lower portion of the vehicle wheels, fluid pressure cylinders and pistons for operating said clamping bars, fluid pressure cylinders and pistons for tilting said platform endwise in opposite directions to discharge the vehicle from one end or the other of said platform, and valve mechanism for controlling the flow of the fluid under pressure to and from said cylinders.

6. In transfer mechanism for wheeled vehicles, the combination of a wheeled support, a platform mounted on said support and having means for guiding rolling vehicles thereon, means on said support for tilting said platform endwise in opposite directions to discharge the vehicle from one end or the other thereof.

7. In transfer mechanism for wheeled vehicles, the combination of a wheeled support, a platform mounted on said support and having means for guiding rolling vehicles thereon, means on said support for bodily raising and lowering said platform and for tilting the same endwise in opposite directions to discharge the vehicle from one end or the other of said platform.

8. In transfer mechanism for wheeled vehicles, the combination of a wheeled support, a platform mounted on said support and having means for guiding rolling vehicles thereon, clamping devices on said platform for holding the vehicle in position thereon, means for operating and releasing said clamping devices, and means on said support for tilting said platform endwise to discharge the vehicle therefrom.

9. In transfer mechanism for wheeled vehicles, the combination of a wheeled support, a turntable thereon, and a platform adapted to receive a vehicle mounted on said turntable, said platform being tiltable endwise to discharge the vehicle therefrom.

10. An apparatus of the character described, comprising a platform adapted to receive a vehicle, a movable overhead support whereby said platform is carried, and power actuated mechanism whereby said platform may be tilted endwise to discharge the vehicle therefrom.

11. An apparatus of the character described, comprising a platform adapted to receive a vehicle, a movable overhead carrier supporting said platform and to which said platform is revolubly connected, and means for tilting said platform endwise to discharge the vehicle therefrom.

12. An apparatus of the character described, comprising a platform having wheel guiding and clamping bars at its side edges, a movable overhead carrier supporting said platform and to which said platform is revolubly connected, and means for bodily raising and lowering said platform and for tilting the same endwise.

13. An apparatus of the character described, comprising a platform adapted to receive a vehicle, a movable overhead carrier supporting said platform, means whereby said platform may be bodily lifted from or lowered to the floor, and means whereby said platform may be tilted endwise.

14. An apparatus of the character described, comprising a platform adapted to receive a vehicle, a movable overhead carrier supporting said platform and to which said platform is revolubly connected, means for bodily raising said platform and means for tilting said platform endwise.

15. An apparatus of the character described, comprising a platform, an overhead frame from which said platform is suspended, side bars depending from said overhead frame to the lower ends of which side bars said platform is connected in manner permitting its vertical movement, a movable overhead carrier connected to said overhead frame, and means for bodily raising and lowering said platform and for tilting the same endwise.

16. An apparatus of the character described, comprising a platform, a movable overhead frame from which said platform is suspended, a movable overhead carrier to which said platform is revolubly connected, side bars depending from said overhead frame and connected at their lower ends to the platform in manner permitting said platform to be raised and lowered, and brace bars extending from the lower ends of said side bars to said overhead frame and means mounted on the overhead frame for raising and lowering said platform.

17. In transfer mechanism for wheeled vehicles, the combination of a platform, an overhead frame for supporting said platform, a movable carrier to which said overhead frame is connected, fluid pressure cylinders and pistons interposed between said frame and said platform, and valve mechanism for controlling the flow of fluid to and from said cylinders to thereby bodily raise and lower said platform and tilt the same endwise in opposite directions.

18. In transfer mechanism for wheeled vehicles, the combination of a platform having guides adapted to coöperate with the vehicle wheels, a frame for supporting said platform, a movable overhead carrier to which said frame is rotatably connected, power-operated mechanism on said carrier for propelling the same, power-operated mechanism on said frame for raising and lowering said platform and for tilting the same endwise, and controlling devices for said power-operated mechanisms mounted on said frame.

19. An apparatus of the character described, comprising a platform adapted to receive a vehicle, a movable overhead carrier whereby said platform is carried and to which said platform is revolubly connected, an electric motor mounted upon said overhead carrier, electric switch mechanism mounted upon said platform and revoluble therewith, and electric connections between said overhead carrier and said platform whereby the passage of current to the motor may be controlled.

PERRY W. SWERN.